Sept. 4, 1928.  W. J. McCONNELL  1,683,253
WORK AND TOOL HOLDER
Filed March 9, 1927   2 Sheets-Sheet 1
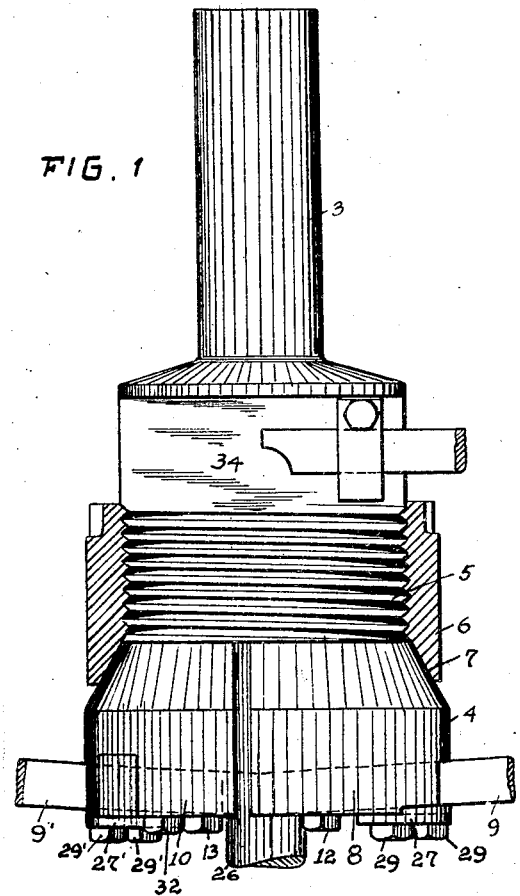
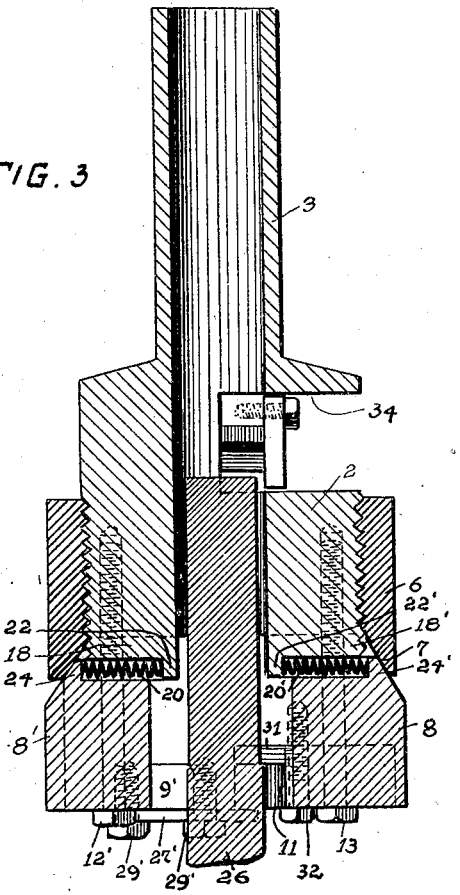
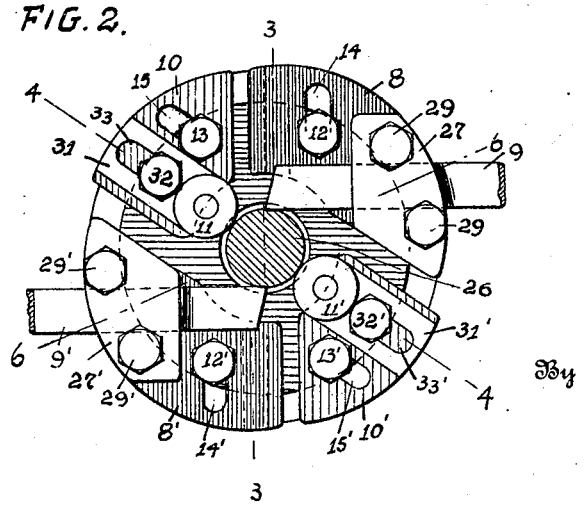
Inventor
W. J. Mc.CONNELL
John A. Bommhardt
Attorney

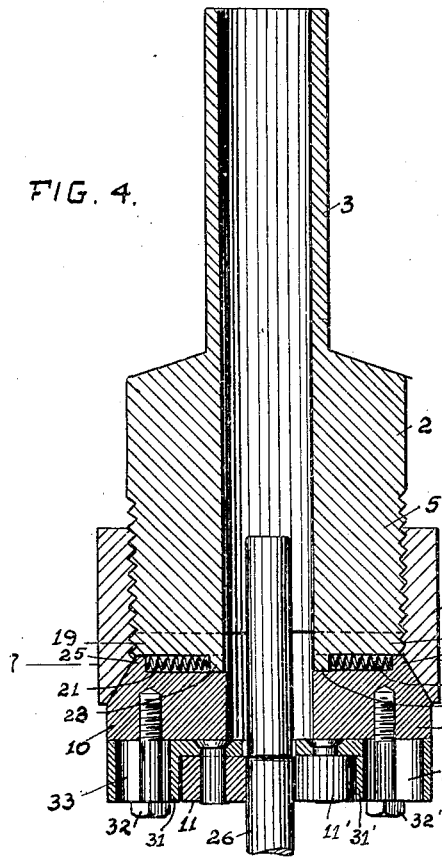

Patented Sept. 4, 1928.

UNITED STATES PATENT OFFICE.

WALTER J. McCONNELL, OF CLEVELAND, OHIO.

WORK AND TOOL HOLDER.

Application filed March 9, 1927. Serial No. 173,996.

My invention has reference, in its broad aspect, to improvements in box mill or turning tool holders, such as are used especially on automatic or hand screw machines or lathes, where the work clamped in a work spindle is rapidly rotated while the tools fastened on a tool slide are made to advance toward said work.

One of the principal objects of my invention is to provide a new and useful tool holder of the type above defined which permits of simple and quick adjustment of one or more tools clamped therein, by one and the same adjusting means; and which furthermore permits the use of pairs of coacting tools which are oppositely arranged to each other, and pairs of coacting work supporting devices also oppositely arranged towards each other. The unique construction of my improved tool holder also permits of the use of the same for different purposes, that is for holding either one or more tools or for only supporting and guiding a work piece and for supporting the work and holding one or more tools.

Other and equally important objects of my invention are more fully described and pointed out in the following description in connection with the drawings attached hereto, in which Fig. 1 is a side elevation of the tool holder with the adjusting nut in section; Fig. 2 shows a bottom view of Fig. 1; Fig. 3, a longitudinal section through the tool on line 3—3 of Fig. 2; Fig. 4, a longitudinal section on line 4—4 of Fig. 2, the tool holder in this view being also adjusted to its smallest size; Fig. 5, a bottom view of Fig. 4 with tools, guiding rollers and adjusting screws removed; Fig. 6, a longitudinal section on line 6—6 of Fig. 2, and Fig. 7 a section on line 7—7 of Fig. 4.

As shown, the tool holder comprises a hollow base member 2 having a customary shank 3 integral therewith and an adjustable head portion 4. The base member (2) is externally screw-threaded from its end as at (5) and an internally screw-threaded adjusting nut 6 is carried thereon for adjustment by rotation on the threads. The lower end portion of nut 6 is internally beveled as at 7 to engage the adjustable head portion 4, which is also beveled to coact with the beveled portion 7 of said nut 6. The adjustable head portion is divided into two pairs of clamping sectors; one pair 8—8 for the cutting tools 9, 9', and one pair 10—10' for supporting or guiding rollers 11—11'. All sectors are clamped to base member 2 by means of set screws 12—12' and 13—13' which are arranged in slots 14—14' and 15—15' respectively to permit shifting of the sectors to any desired position. The shifting of the sectors may be readily done by turning of adjusting nut 6 after loosening of said clamping set screws 12, 12' and 13, 13' whereby all sectors will be moved toward each other closer to the center of the tool holder. This movement of the sectors is governed by keyways (16, 16', 17 and 17') arranged in the sectors and coacting with extension ribs (18, 18', 19 and 19') on the bottom part of base member 2. The keyways form at the same time cages for compression springs 20, 20', 21 and 21' which abut at their ends against extensions 22, 22', 23 and 23' of said ribs 18, 18', 19 and 19' and elevations (24, 24', and 25 and 25') in the end part of said keyways 16, 16', 17 and 17' thereby providing means for always pressing said sectors in tight engagement with said adjusting nut 6, so that left or right turn of said nut will either bring all sectors closer together or to permit the springs to move them farther apart. From the foregoing it will be understood that the clamping cap screws for the sectors must be loosened up before any such adjustment can take place.

The sectors 8 and 8' carry the cutting tools 9 and 9' which are slightly inclined towards the work 26 and are rigidly clamped in place by clamping plates (27 and 27') bolted to the sectors 8 and 8' respectively by means of short cap screws 29 and 29'. This arrangement permits exchange of the cutting tools without changing the adjustment of the sector itself and it further permits the exchange of a whole sector without changing the position of the tool on that sector.

Sectors 10 and 10' are provided with guiding rollers arranged in slots 30, 30' respectively, which rollers are separately adjustable by means of blocks 31 and 31' to which the rollers are fastened and which are slidably arranged in said slots 30 and 30' and clamped to sectors 10, 10′ by means of relatively short cap screws 32, 32′ arranged in slots 33, 33′ of the blocks 31, 31′.

As can readily be seen, each one of sectors 8, 8′, 10 and 10′ may be taken off or exchanged at will of the operator, without interfering with the action of the other sectors. In Figs. 1 and 3, I also show point facing tools for the end of the work which same are adjustably arranged on and clamped to the flat face of a cut out portion 34 in the upper part of the base member 2, while in Figs. 4 and 6 the facing tool and the cut out portion in the base member are omitted as not being necessary to the proper understanding of these figures.

I may state that the arrangement of a pair of cutting tools in the same holder opposite to each other and both for the same purpose considerably cuts down production costs by permitting practically double advance of the working tools, furthermore the arrangement of clamping devices in such a manner that they are adjustable by one and the same adjusting means speeds up adjustment of the tools while insuring the desired relationship thereof, necessary for a double cut on the work.

While I have described and illustrated in the foregoing a specific form of my invention, I desire it to be specifically understood that I do not thereby wish to be limited except as may be indicated by the scope of the claims appended hereunto and forming a part of this specification.

I claim:

1. In a work and tool holder, a threaded body portion formed with a shank, a head formed of slotted segments slidable radially on the front end of the body, bolts extending through the slots and into the body, tools clamped to the front ends of the segments, and a wedging screw collar carried by the body and engaging the rear ends of the segments for positively adjusting the same.

2. In a device of the type described, a body portion formed with a shank thereon, a wedging collar screwed on the body, a head having a rear beveled portion cooperating with the collar, said head being formed of slotted movable sections slidable radially on the front end of the head and adapted to be forced together upon movement of said collar against the beveled portion of the head, bolts extending through the slots and into the body, slotted blocks on the front end of the sections, bolts extending through the slots in the blocks and into the sections, and rollers mounted on the blocks.

In testimony whereof, I do affix my signature.

WALTER J. McCONNELL.